G. B. JOHNSON.
MACHINE FOR SHEARING METAL SHEETS.
APPLICATION FILED DEC. 30, 1908.

941,199.

Patented Nov. 23, 1909
8 SHEETS—SHEET 2.

Fig. 2.

WITNESSES:
W. M. Avery
A. H. C. Davis

INVENTOR
Godfrey Benington Johnson
BY
Munn & Co
ATTORNEYS

G. B. JOHNSON.
MACHINE FOR SHEARING METAL SHEETS.
APPLICATION FILED DEC. 30, 1908.

941,199.

Patented Nov. 23, 1909.
8 SHEETS—SHEET 3.

WITNESSES:
W. M. Avery
A. C. Davis

INVENTOR
Godfrey Benington Johnson
BY
ATTORNEYS

G. B. JOHNSON.
MACHINE FOR SHEARING METAL SHEETS.
APPLICATION FILED DEC. 30, 1908.

941,199.

Patented Nov. 23, 1909.
8 SHEETS—SHEET 4.

WITNESSES:
W. M. Avery
A. H. Davis

INVENTOR
Godfrey Benington Johnson
BY
Munn & Co.
ATTORNEYS

G. B. JOHNSON.
MACHINE FOR SHEARING METAL SHEETS.
APPLICATION FILED DEC. 30, 1908.

941,199.

Patented Nov. 23, 1909.

WITNESSES
W. M. Avery
A. C. Davis

INVENTOR
Godfrey Benington Johnson
BY
Munn & Co.
ATTORNEYS

G. B. JOHNSON.
MACHINE FOR SHEARING METAL SHEETS.
APPLICATION FILED DEC. 30, 1908.

941,199.

Patented Nov. 23, 1909.
8 SHEETS—SHEET 7.

WITNESSES:
W. M. Avery
A. H. Adams

INVENTOR
Godfrey Benington Johnson
BY
ATTORNEYS

G. B. JOHNSON.
MACHINE FOR SHEARING METAL SHEETS.
APPLICATION FILED DEC. 30, 1908.

941,199.

Patented Nov. 23, 1909.
8 SHEETS—SHEET 8.

WITNESSES
W. M. Avery
A. H. Davis

INVENTOR
Godfrey Benington Johnson
BY
ATTORNEYS

UNITED STATES PATENT OFFICE.

GODFREY BENINGTON JOHNSON, OF LONDON, ENGLAND.

MACHINE FOR SHEARING METAL SHEETS.

941,199. Specification of Letters Patent. Patented Nov. 23, 1909.

Application filed December 30, 1908. Serial No. 470,017.

*To all whom it may concern:*

Be it known that I, GODFREY BENINGTON JOHNSON, a subject of the King of Great Britain, and resident of 8 Victoria street, in the city of Westminster, London, England, engineer, have invented an Improved Machine for Shearing Metal Sheets, of which the following is a specification.

This invention relates to an improved construction of shearing machine which is designed to facilitate, and reduce the manual labor incidental to, the accurate shearing of metal sheets to a rectangular form, the principal object of the invention being to overcome the difficulties at present experienced in connection with such operations when performed by a single shearing cutter to which the edges of the sheet are successively presented, and more especially when it is required to simultaneously cut a number of roofing sheets in the "pack" as the latter is delivered from the rolling mill.

The shearing machine of the present invention comprises a main knife having a length sufficient to cut, at a single stroke, the long edge of the longest sheet with which the machine is designed to deal, this knife being double-edged so as to be adapted to coact simultaneously with both members of a pair of bed-cutters forming the opposed lateral edges of a pair of similar tables disposed in one horizontal plane at the respective sides of the knife.

The machine also comprises two pairs of what may be termed auxiliary knives whose function is to cut the ends of the sheet or pack, each pair of auxiliary knives being arranged at one end of the main knife and the members of each pair being mounted in alinement with one another so as to operate at right angles to and at opposite sides of, the main knife, in conjunction with bed-cutters forming the corresponding end edges of the respective tables. Each of the auxiliary knives is of a length sufficient to cut, at a single stroke, the short edge of the widest sheet with which the machine is designed to deal.

In connection with either or both of the tables, stops are provided in rows parallel to the main knives and at distances therefrom and from the auxiliary knives corresponding to various standard widths and lengths of sheet, these stops, which serve as guides for the work during the cutting operation, being capable of being projected above or retracted flush with the surface of the table according as they are or are not required to be in operation.

In the accompanying drawings Figs. 5 to 9 are drawn to a larger scale. Figs. 10, 11, 12, 13 and 14 are diagrammatic plan views illustrating the preferred method of using the machine to cut a pack of roofing sheets; while

Similar reference letters and numerals denote corresponding parts throughout the drawings.

Figure 4:
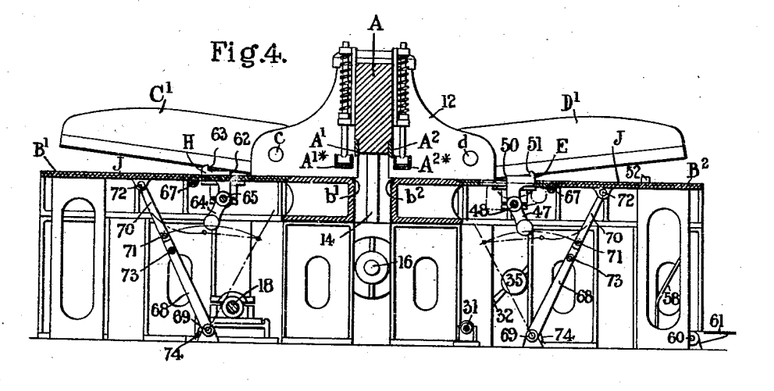
Fig. 4 is a central vertical transverse section of the machine.

The main knife comprises a holder A carrying at the lower edges of its opposite faces a pair of blades $A^1$, $A^2$ (Fig. 4) adapted to coact simultaneously with bed-cutters $b^1$, $b^2$ which constitute the opposed lateral edges of a pair of similar tables $B^1$, $B^2$ extending in one horizontal plane at the sides of the knife. The end edges $c^1$, $c^2$ and $d^1$, $d^2$ of the respective tables $B^1$ and $B^2$ are formed as bed-cutters with which the auxiliary knives $C^1$, $C^2$ and $D^1$, $D^2$ coact, the knives $C^1$, $D^1$ extending in alinement with one another on opposite sides at one end of the main knife and those $C^2$, $D^2$ similarly at the other end thereof.

The main knife is of the guillotine type, the opposite end of its holder A being fitted to reciprocate vertically in guides as at 11 in the end frames 12 of the machine, and being provided with gudgeons 13 coupled by connecting rods 14 to cranks 15 on a pair of horizontal crank-shafts 16 extending in alinement with one another at opposite ends of the machine, and in the same vertical plane as that in which the main knife reciprocates. The cranks 15 are of equal throw and are adjusted in alinement with one another, the shafts 16 being also rotated at equal speed, so that the cutting edges of the blades $A^1$, $A^2$ which are set at the usual cutting angle with reference to the bed-cutters $b^1$, $b^2$, maintain their proper inclination to the bed-cutters throughout the entire stroke of the knife.

Figure 1:
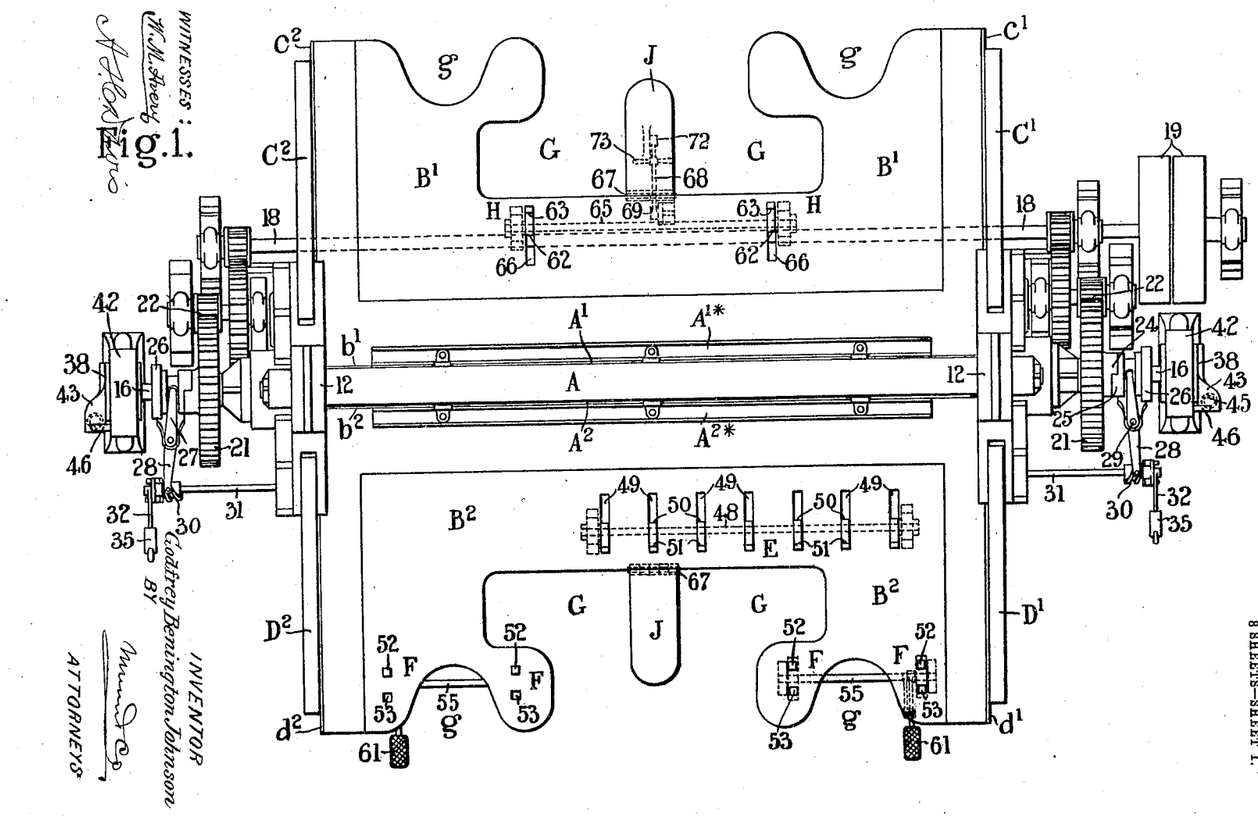
Figure 1 is a plan view of a machine constructed according to the present invention.
Figure 2:
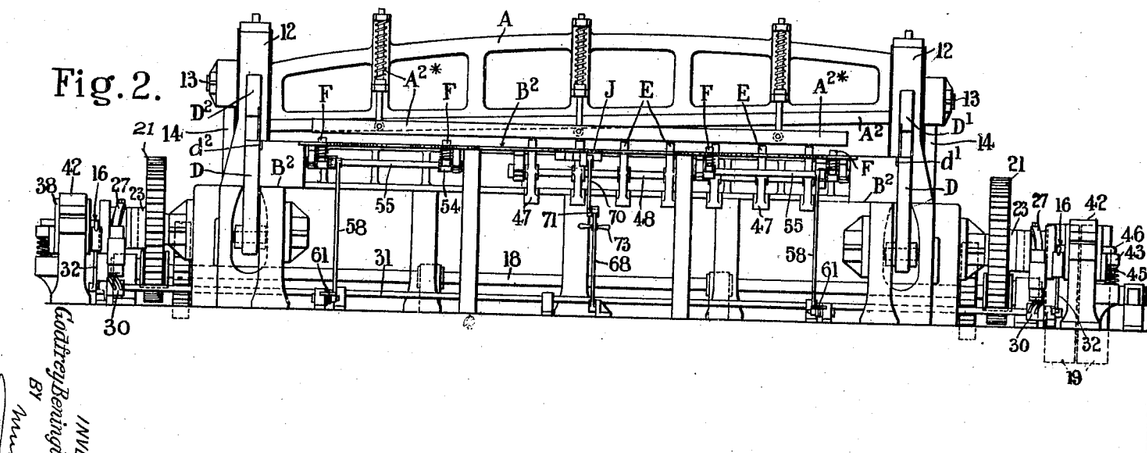
Figs. 2 and 3 are respectively a side and an end elevation of the same.
Figure 3:
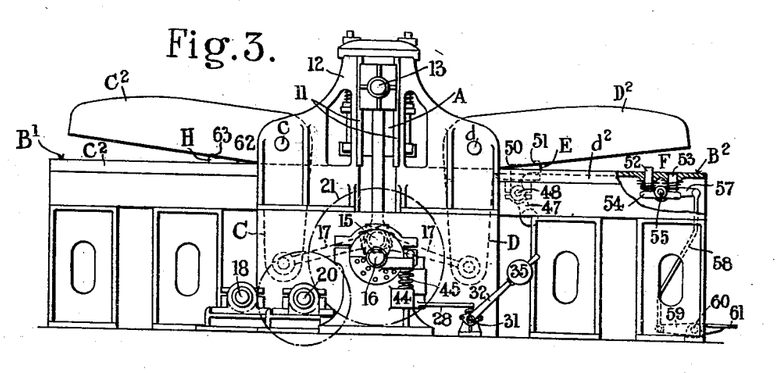

The auxiliary knives $C^1$, $C^2$; $D^1$, $D^2$ are of the scissor type and are so arranged as to open away from the main knife A, each knife constituting one arm of a bell-crank lever pivoted to the end frame 12 of the machine at $c$ or $d$ as the case may be, while the other arm C or D of the lever extends downward and is coupled by a connecting rod 17 to the crank 15 at the corresponding end of the machine. Each crank 15 consequently actuates (through three separate connecting rods) not only one end of the main knife, but also the two auxiliary knives at the same end of the machine, all the knives working together and performing one complete cutting and return stroke for each revolution of the crank-shaft 16, as will be understood from Fig. 3.

The two crank-shafts 16 (which rotate at a relatively low velocity) are driven at each end from a single shaft 18 extending parallel to both, from end to end of the machine by means of a spur wheel mounted on said shaft engaging a large spur wheel mounted on a second axis, said second axis carrying a smaller spur wheel engaging the spur wheel 21 attached to the crank shaft 16, the main or driving shaft 18 being rotated continuously at a relatively high velocity from any convenient source of power, preferably through fast and loose pulleys as at 19 on the shaft. Since it is necessary at times to arrest the main knife when at the highest point in its stroke, in order to permit of the work being passed from one table to the other beneath said knife as hereafter described, means are preferably provided for simultaneously disconnecting, at will, both crank-shafts 16 from the main shaft 18 and for concurrently preventing rotation of these crank-shafts when they attain the highest point in their throw; the consequent arrest of the cranks resulting in the arrest of all the knives in the position indicated in Fig. 3. The preferred arrangement for effecting this is as follows.

Each crank-shaft 16 carries a spur-wheel 21 which gears constantly with a pinion 22 fast on a crank-shaft 20 driven from the main shaft 18, the wheel 21 being adapted to turn loosely (but without longitudinal movement) upon the crank-shaft and being provided at the outer end of its hub 23 with one member 24 of a dog-clutch whereof the other member 25 is on a clutch-body 26 splined upon the shaft 16. The dog-clutch is single-toothed or otherwise so formed as to be capable of being thrown into gear only when its members 24 and 25 occupy one definite angular position relatively to one another; this position corresponding to that point in the revolution of the crank-shaft when the crank 15 is at the highest point in its throw.

In order to enable the clutches appertaining to the two crank-shafts 16 to be operated simultaneously, each clutch-body 26 is engaged by a fork 27 upon (or moving as one with) a lever 28 fulcrumed as at 29 and controlled by a helical cam 30, the cams appertaining to the two clutches having convolutions which wind in opposite directions, and being fast on opposite ends of a rocking shaft 31 which extends from end to end of the machine parallel to the main shaft 18. At each end, the rocking shaft 31 is provided with a hand-lever 32 by means of which it may be partially rotated between limits (determined by stops 33, 34) corresponding to the throw of the cams 30 and the movement of the clutch-bodies 26, each hand-lever 32 carrying a counterweight 35 sufficient to retain the rocking shaft (together with all the parts controlled thereby) in that one of its two extreme angular positions to which it may be thus brought.

Figure 5:
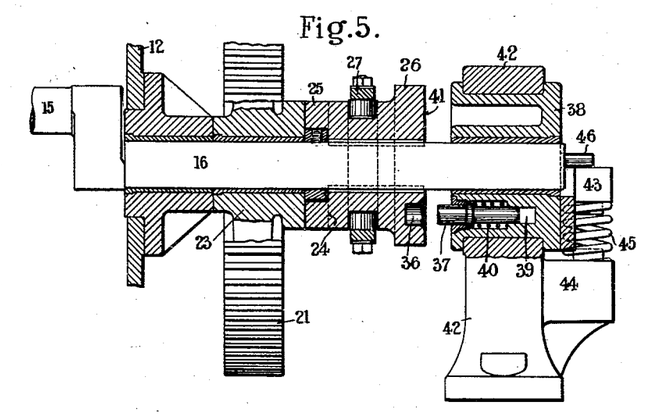
Fig. 5 is a longitudinal sectional elevation of the clutch mechanism for arresting the knives.
Figures 6, 7:
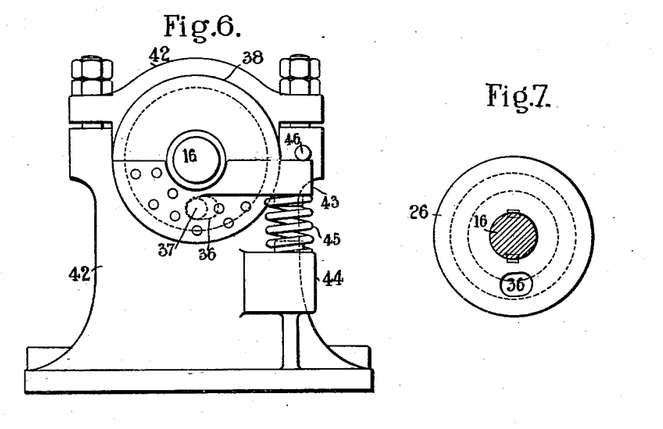
Fig. 6 is an outside end elevation of the same.
Fig. 7 is a face view of the clutch.
Figure 8:
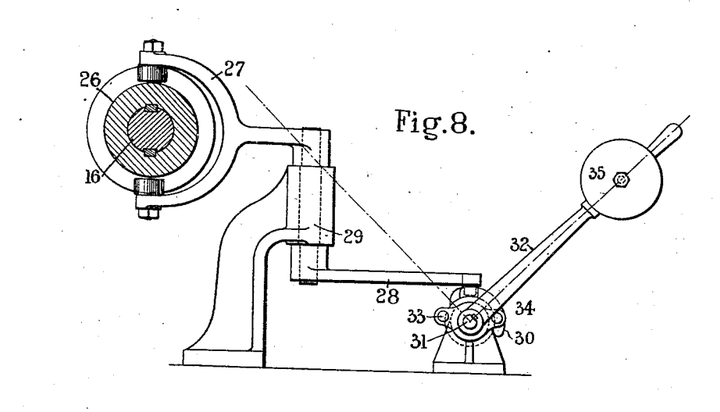
Fig. 8 is an end elevation and Fig. 9 is a plan view of the cam mechanism for throwing the knife-arresting clutch into and out of operation.
Figure 9:
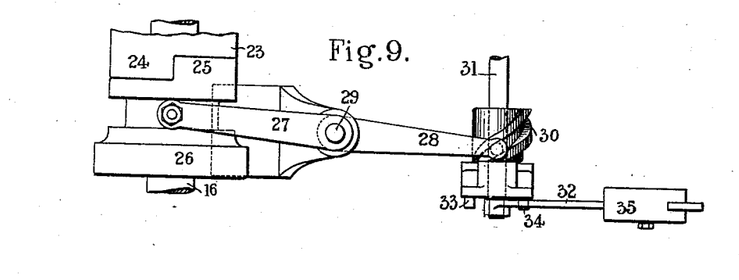
Figure 10:
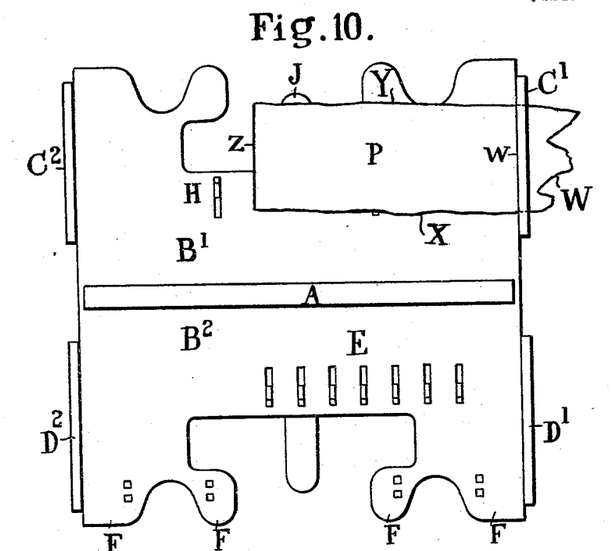

It being necessary that both crank-shafts 16, on being simultaneously disconnected from the main shaft 18, should (as already stated) also be instantly arrested, each clutch-body 26 is provided, at the end opposite to the clutch-member 25, with a recess 36 which, on the cranks 15 attaining the highest point in their throw, is engaged by a stud 37 projecting from a stationary bearing 38 for the crank-shaft, the recess 36 being preferably in the form of a segmental slot slightly longer than the diameter of the stud 37 so as to allow time for the movement of the clutch-body lengthwise of the shaft on which it is splined. As it would be inconvenient for the attendant to be compelled to remain on watch so as to be in readiness to operate either of the hand-levers 32, in the direction to disconnect the crank-shafts 16 from the main shaft 18, only at the exact moment when the recess 36 comes into registration with the stud 37, the latter is mounted to slide in a socket 39 parallel to the crank-shaft 16, and is normally caused by a spring 40 to project from the face of the bearing 38 as shown in Fig. 5. The opposed face 41 of the clutch-body 26, wherein the recess 36 is formed, is made flat, so that if the hand-lever 32 be operated to move the clutch-body 26 toward the bearing 38 while the recess 36 and stud 37 are out of registration with one another, the stud, being encountered by the flat face 41 of the clutch-body, will be forced back into its socket 39 against the pressure of the spring 40 until, on the recess coming opposite to the stud, the latter will be shot outward by the spring into engagement with the recess and the clutch-body, together with the crank-shaft 16 whereon it is splined and all the knives driven by said shaft, will be arrested in the position indicated in Fig. 3.

Inasmuch as the weight and inertia of the knives and other parts connected to and moving as one therewith is very considerable, it is advisable to make provision for obviating any risk of the studs 37 being shorn off or bent in consequence of the severe transverse strain thrown upon them by the arrest of the knives and attached parts. For this purpose the bearing 38 may, as shown, be itself mounted to rotate through a small angle in a secondary or outer bearing 42 which is fixed, the angular movement of the inner bearing 38 relatively to the outer bearing 42 (under the impulse communicated to the former from the knives etc. through the stud 37) being limited by an elastic resistance adapted, after absorbing the inertia of the moving parts, to return them to a position corresponding to the highest point in the throw of the cranks 15 and main knife A. In the arrangement illustrated, the inner bearing 38 is provided with an arm 43 between which and an anvil-block 44 (carried by the fixed outer bearing 42) a strong buffer-spring 45 is interposed, this spring being constantly under compression so as to normally retain the arm 43 in contact with a stop 46 serving to determine the normal angular position of the bearing itself and therefore of the stud 37.

Each blade of the main knife is provided with an automatically acting spring-pressed clamp for holding the work firmly in position upon the table during the actual shearing operation. These clamps, which are indicated at $A^{1x}$, $A^{2x}$, respectively, may be of any ordinary or convenient construction whereby they are adapted to remain in action from just before the commencement to just after the completion of the cut, and to be lifted at other times sufficiently above the table to permit of the work being slipped beneath the respective knives. It will therefore be unnecessary to further describe or refer to them. If desired, corresponding spring-pressed clamps may be provided in connection with the auxiliary knives.

The shearing operation is commenced upon the first or "roughing out" table $B^1$, whereon the knives $C^1$, $C^2$ are used for performing the preliminary trimming operation on the respective ends of single sheets, the knife $C^2$ alone requiring to be thus used in the case of a pack, in connection with which it is employed to cut off the rough short end opposite to the principal fold before the pack is presented to the main knife A. As the long edges of a sheet or pack are usually approximately straight and parallel to one another, the one farthest from the main knife may be utilized as a guide in cutting the other when this latter long edge is presented to the main knife A for the purpose of making the first long cut. Accordingly two pairs of stops H, H are provided on the table $B^1$ at a distance from one another less than the shortest length of sheet, each pair (in the example illustrated) comprising front and rear stops 62, 63 whose distances from the face of the blade $A^1$ of the main knife are to be understood as corresponding respectively to the two standard widths of roofing sheets usually produced. As is well known, these standard widths usually differ from one another in this country by six inches. Each of these pairs of stops is formed by the upper end of a counterweighted lever 64 mounted to swing about an axis beneath the level of the table, the axes of the two pairs H, H being in alinement with one another and being (in the arrangement illustrated) formed by a single rod 65 which serves in common for both stop-levers and extends parallel to the main knife A. The levers 64 project upward through slots 66 provided in the table at right angles to the main knife, each slot being of such position and length that while the upper end of the stop-lever is normally retained by its counterweight in contact with the end of the slot farthest from the knife, so as to be incapable of being moved farther from the latter, the lever can be rocked toward the knife so as to yield and disappear beneath the surface of the table if, for example, the sheet or pack, in being fed toward the main knife, is pushed against the back of the stops. In each pair of these stops H, H, the one 62 nearest to the main knife A is formed by the corresponding edge of the stop-lever 64, the other stop 63 of the pair being formed by a step on the upper end of the lever in rear of and at a higher level than the stop 62, so that in cases where the sheet or pack to be cut is of the greater of the two standard widths above mentioned, its rear margin may rest, not on the table but on the lower step of the two stop-levers, the rear edge of the sheet or pack then butting, not against the front stops 62, but against the rear stops 63.

After the necessary operations have been performed on the roughing out table $B^1$, the sheet or pack is passed beneath the main knife A on to the sizing and finishing table $B^2$. The stops (denoted broadly by the reference letter E) for determining both the finished width and length of sheet to be cut on this table $B^2$, are provided on the upper ends of a series of counterweighted levers 47 (similar to the stop-levers 64 already described) mounted to swing independently of one another about a common axis 48 beneath the level of the table, this axis extending parallel to the main knife and the levers projecting upward through slots as at 49 extending at right angles thereto.

Each lever 47 has its upper end stepped to constitute two independent stops 50 and 51, and is normally held by its counterweight against the rear end of the slot 49 so that all the front stops 50 are normally presented in a straight row parallel to the main knife and at a distance from the blade $A^2$ (at that side of the main knife) equal to the minimum width of sheet to be cut, while all the rear stops 51 normally stand above the level of the first stops 50, and likewise in a straight row, at a distance from the same blade $A^2$ equal to the maximum width of sheet. That end of each slot 49 which is farthest from the knife is so placed that the stop-lever which projects through it cannot be turned about the axis 48 in a direction to move the stops on the lever farther away from the knife blade $A^2$ than the distance just mentioned; but each slot extends toward the knife a distance sufficient to permit of the lever yielding to pressure in that direction so far that the lever can be turned through an angle sufficient to carry both stops 50 and 51 beneath the level of the table as indicated in dotted lines in Fig. 4.

For the purpose of determining the finished length of sheet which can be cut, the distances separating the successive stop-levers 47 from the opposed face of the "finishing" auxiliary knife $D^2$ are made equal to the progressively increasing standard lengths of sheet; such increase, as is well known, being in this country usually one foot. The method of using the stops E for determining the length of sheet to be cut will be explained hereafter.

In addition to the above described stops E (which may be called the main or sizing stops), other stops (denoted broadly by the reference letter F) are provided on the table $B^2$ for the purpose of guiding the sheets as the latter are slid along the table, in a direction parallel to the main knife A, toward and under either of the auxiliary knives $D^1$ or $D^2$. These secondary or guide-stops F, which are placed at about twice the distance of the sizing stops E from the main knife, are arranged in two double pairs or sets, one toward each end of the table. Each set comprises one pair of front stops 52, 52, set on a line parallel to the main knife A and at a distance from the back of the main stops E rather less than the minimum width of sheet to be cut, and a second pair 53, 53 directly in rear of the first pair 52, 52 and at a distance therefrom approximately equal to the distance between the sizing stops 50 and 51. The arrangement is such that all the front stops 52, at both ends of the table, extend in a straight row parallel to the main knife A while all the rear stops 53 similarly extend in a second row parallel to the first.

The front pair of stops 52 of the set F at each end of the table are normally held raised above the surface of the table while the rear pair 53 are depressed beneath or kept flush with said surface, means being provided whereby, on the actuation of a treadle, the relative levels of the two pairs will be reversed for a purpose hereafter explained. This may be effected by forming each stop as a plug mounted to slide vertically through an aperture in the table, one stop 52 and 53 of each pair resting on the corresponding ends of a sway-bar 54 fast on a rock-shaft 55 which is journaled in bearings beneath the table and serves for operating both pairs of a set of stops. A lever 57, also fast on the rock-shaft 55, is coupled by a rod 58 to a treadle-lever 59 fulcrumed at 60 and provided with a treadle 61 in some position convenient for the attendant so that, on the depression of the treadle, the pair of stops 52 will descend and the pair 53 will be raised into operative position. The sway-bars 54 may be retained in their normal angular position by means of a spring or springs as indicated.

Each table $B^1$ and $B^2$ is preferably formed with a gap or gaps opening out at the edge farthest from the main knife A, so as to enable the attendant at that side of the machine to gain access readily to the work, upon whatever part of the table it may be lying, the gap or gaps being however so arranged as to avoid interfering with the support which the table must under all circumstances afford to the work. In order the better to insure this, each gap may be made capable of sub-division at will by means of a folding leaf or leaves, each leaf extending into the corresponding gap so as, by presenting normally an extension of the general surface of the table, to afford an intermediate support for the work when the latter is laid across the gap at that point, but being capable of being dropped so as to permit of the attendant moving freely at a shorter distance from the knife or knives.

In the arrangement illustrated, each table has, in addition to smaller gaps $g$ between the pairs of stops F at each end of the table, a large central gap G of approximately T-shape which is normally divided into two portions by a leaf J hinged to the edge of the table as at 67 and capable of being folded downward out of the way when desired. For this purpose each leaf J may be supported by means of toggle mechanism comprising a lever 68 pivoted at 69 to the base of the machine and a link 70 pivoted to said lever at 71 and to the underside of the leaf at 72, a handle being provided on the lever 68 as at 73 for manipulating the leaf. When the toggle is straightened out to support the leaf rigidly in the raised position, the lever 68 is arrested by a stop 74.

Each table would be provided with the customary grooves or slots (not shown) for the accommodation of the usual claw-grabs employed in handling the sheets or packs.

Figure 11:
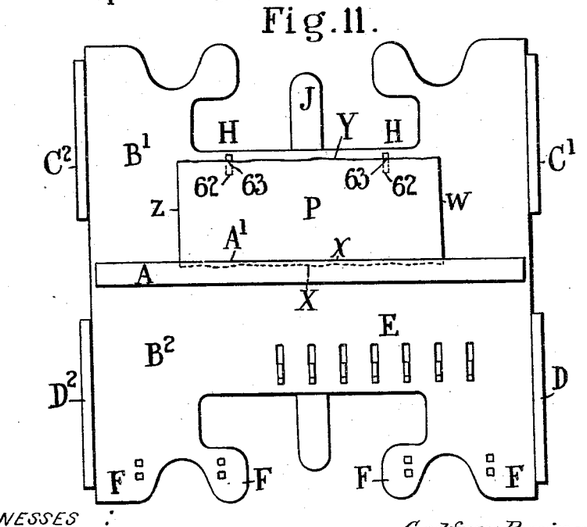
Figure 12:
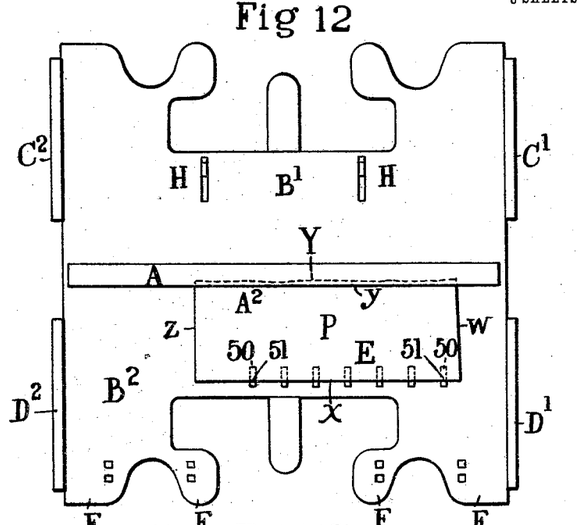
Figure 13:
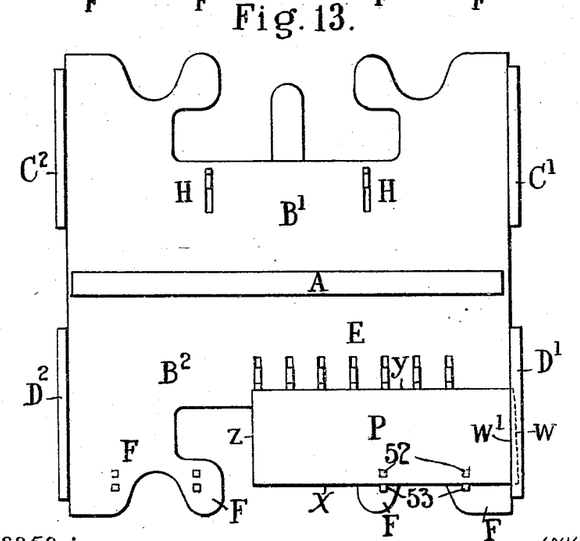
Figure 14:
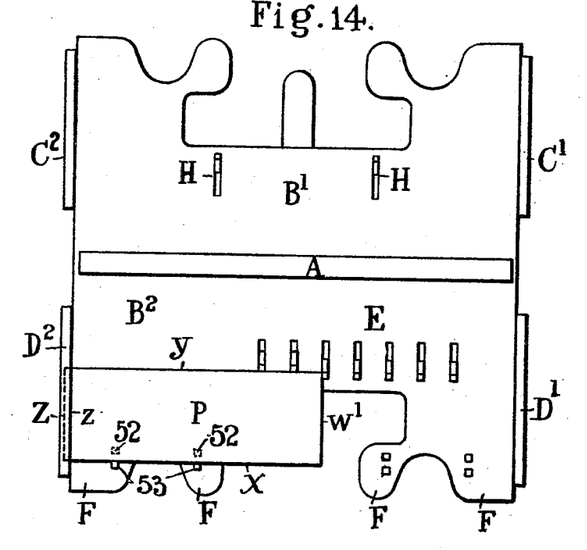
Figure 15:
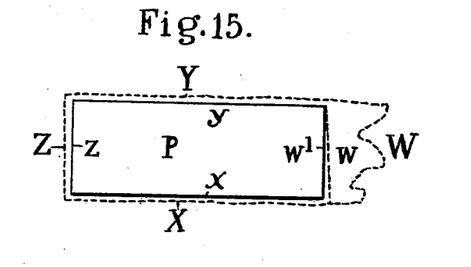
Fig. 15 is a corresponding view showing the same pack after shearing, the original form of the pack being indicated by dotted lines.

The preferred method of using the machine will be described with reference to Figs. 10 to 15 and is as follows. Let it be assumed that it is required to cut a pack P (Fig. 15) whose folded end (in the case of a pack of four, the double-folded end) is denoted by Z, its opposite or rough end by W, and its rough long sides by X and Y respectively. The pack is first laid upon the table $B^1$ with the straight fold Z approximately parallel to the auxiliary knife $C^2$; the pack is then slid bodily toward and beneath the opposite knife $C^1$ (see Fig. 10) so that this knife, on descending, shall shear off the rough end W approximately parallel to the fold Z and at the greatest practicable distance therefrom. The pack, having now two approximately parallel straight ends $w$ and $z$, is slid clear of the knife $C^1$, and pushed over the pairs of stops H (which yield to the pressure thus applied to them from behind) until that edge Y of the pack which is farthest from the main knife A drops over and rests in contact with either the rear stops 63 or the front stops 62 according as the sheets to be cut are of the maximum or minimum standard width. In the example illustrated the sheets are supposed to be of the maximum width, so that, when the long rough edge Y of the pack is in contact with the rear stops 63 of each pair H as shown in Fig. 11, the other long rough edge X will be in a position to be shorn by the blade $A^1$ of the main knife A which coacts with the bed-cutter $b^1$ of the table $B^1$. When the main knife has performed its shearing stroke, the first long cut edge $x$ thus produced constitutes a guiding edge for all the succeeding operations. The main knife A is now arrested at the highest point in its stroke, and the pack is thereupon slid through beneath this knife until the greater part of it rests upon the table $B^2$, the cut edge $x$ being either allowed to butt against the first or front stops 50 (of the sizing set E), or lifted over these first stops so as to butt against the second or rear stops 51 (of the same set), according as the pack is capable of producing sheets of the minimum or maximum width. In the example illustrated (see Fig. 12), it being assumed that sheets of the maximum width will be produced, the rear stops 51 are shown as in use. The main knife A is thereupon allowed to descend, when its blade $A^2$ (nearest the sizing stops E) will shear the rough long side Y of the pack, forming a second long cut edge $y$ truly parallel to, and at the desired distance from, the long cut edge $w$ already shorn. The pack is now drawn over the sizing stops E, and away from the main knife A, in order that its ends may be trimmed. Assuming the cut edge $w$ to be not quite truly at right angles to the long parallel edges $x$ and $y$, this short edge $w$ is first trued-up. For this purpose the long edge $x$ is caused to butt against either the front or rear pair 52 or 53 of that set of guide-stops F which appertain to the auxiliary knife $D^1$ at the corresponding end of the machine, according as it may be found most convenient in view of the width of the pack. In the example illustrated (see Fig. 13) it being assumed that the pack has been cut to the maximum width, the rear stops 53 are shown as in use, the treadle 61 which serves to withdraw the front stops 52 of the same set and raise these stops 53 to operative position being depressed for this purpose. At the same time, as many of the sizing stops E as may be necessary are thrust forward out of the way to make room for the pack in its present position, as indicated, the sizing stops swinging freely for the purpose about their common axis. Using the stops 53 as a guide, the pack is now slid lengthwise toward and beneath the knife $D^1$ just so far as may be necessary to trim the already cut edge $w$ so that its entire length shall be at right angles to both the long edges $x$ and $y$. There remain now only the final operations of determining the length of sheet to be produced from the pack, and of shearing the folded end Z so as both to bring the pack as a whole to this length, and also, simultaneously, to sever from one another the various superposed sheets which thus far have been united by the fold. Now, as has been already explained, the distances of the respective sizing stops E from the "finishing" auxiliary knife $D^2$ are made equal to the several standard lengths of sheet to be cut. Hence, in order to determine the finished length of the sheet, it is only necessary to slide the pack lengthwise toward the knife $D^2$ (still using the stops F as guides, and of course now bringing into play those at the corresponding end of the table) until, as a first requirement, the pack has passed far enough beneath the knife $D^2$ to insure the fold Z being completely shorn off on the descent of the knife (this being the minimum requirement as to distance); and, as a second requirement, to cause the already trimmed end $w^x$ of the pack to butt against the lateral face of that one of the sizing stops E which is the farthest from the knife $D^2$ that will permit of such complete severance at the fold Z being effected. Obviously those sizing stops E which intervene between the one selected and the knife $D^2$ must meanwhile be thrust forward toward the main knife A out of the way of the pack as indicated in Fig. 14. The knife $D^2$ may now be allowed to descend so as to shear off the fold Z at $z$, when the entire operation will be complete, the whole being accurately effected without the necessity of either marking out, turning over, or sluing around the pack; manifest advantages of the greatest importance. The finished and severed (but still superposed) sheets into which the pack is thus divided may now be removed from the machine.

It will readily be seen that while the various operations are proceeding as described on the table B², the preliminary trimming of the rough end W and first rough side X of a fresh pack on the table B¹ may be effected.

The waste cuttings from the main knife A fall through the space between the bed-cutters b¹ and b² and may be received on a trolley running upon rails in a pit or tunnel extending beneath and parallel to the main knife, it being obvious that both the main shaft 18 and rocking shaft 31 should be placed clear of the mouth of this pit.

If preferred, each table B¹ and B² may be used independently for cutting separate series of sheets or packs, an arrangement which, however, obviously involves the work being either turned over or slued around between the first and second long cuts in order that the long sides of the sheet or pack may be presented in succession to the same side of the main knife.

In some cases, as for example where sufficient room is not available for the installation of a duplex machine as above described, a single table only may be provided, the main knife in such case having only one working edge and auxiliary knives being provided only at that side of the main knife at which the table is placed.

Having now particularly described and ascertained the nature of the said invention and in what manner the same is to be performed, I declare that what I claim is:—

1. A machine for shearing metal sheets to rectangular form without the necessity of turning over or sluing around the work between successive stages of the shearing operation, comprising a double-edged main knife adapted to coact simultaneously with both members of a pair of bed-cutters forming the opposed lateral edges of a pair of tables disposed in one horizontal plane at opposite sides of said knife; two pairs of auxiliary knives each situated at one end of the main knife, the members of each pair being arranged on opposite sides of and at right angles to the main knife so as to be adapted to coact with bed-cutters forming the corresponding end edges of the respective tables; and stops adapted to serve as guides for the work on the tables, disposed in rows parallel to the main knife and at distances therefrom and from the auxiliary knives corresponding to various widths and lengths of sheet to be produced, substantially as set forth.

2. In a machine for shearing metal sheets to rectangular form without the necessity of turning over or sluing around the work between successive stages of the shearing operation, the combination of a double-edged main knife adapted to co-act simultaneously with both members of a pair of bed cutters forming the opposed lateral edges of a pair of tables disposed in a horizontal plane at opposite ends of said knife, two pairs of auxiliary knives each situated at one end of the main knife, the members of each pair being arranged on opposite sides of and at right angles to the main knife so as to be adapted to co-act with bed cutters forming the corresponding end edges of the respective tables, stops adapted to serve as guides for the work on the tables, said stops being disposed in rows parallel to the main knife and at a distance therefrom and from the auxiliary knives corresponding to various widths and lengths of the sheet to be produced, and means whereby the rows of stops may be brought alternately above the table.

3. In a machine for shearing metal sheets to rectangular form without the necessity of turning over or sluing around the work between successive stages of the shearing operation, the combination of a double-edged main knife adapted to co-act simultaneously with both members of a pair of bed cutters forming the opposed lateral edges of a pair of tables disposed in one horizontal plane at opposite ends of said knife, two pairs of auxiliary knives each situated at one end of the main knife the members of each pair being arranged on opposite sides of and at right angles to the main knife so as to be adapted to co-act with bed cutters forming the corresponding end edges of the respective tables, stops adapted to serve as guides for the work on the tables, disposed in rows parallel to the main knife and at distances therefrom and from the auxiliary knives corresponding to various widths and lengths of sheet to be produced, and means for enabling each row of stops to be alternately brought above the table, said means comprising a sway bar wherein said stops rest, a rockshaft secured to said sway-bar, a lever fast on said rock-shaft, a rod coupled to said lever, and a treadle lever attached to said rod, substantially as set forth.

4. In a machine for shearing metal sheets to rectangular form without the necessity of turning over or sluing around the work between successive stages of the shearing operation, the combination of a double-edged main knife adapted to co-act simultaneously with both members of a pair of bed cutters forming the opposed lateral edges of a pair of tables disposed in one horizontal plane at opposite ends of said knife, and means for enabling said double-edged main knife to be arrested when at the highest point in its stroke, said means comprising at each end of said knife, a gudgeon attached to said knife, a connecting rod coupled to said gudgeon, a crank coupled to said connecting rod, a crank-shaft attached to said crank, a spur wheel adapted to turn loosely on said shaft, a female member of a single-toothed dog clutch forming part of and attached to said spur wheel, a male member of said single toothed dog clutch adapted to engage said female part, said male member of said single-toothed dog-clutch splined upon said shaft, said male member of said single-toothed dog-clutch engaged by a fork, said fork attached to a fulcrumed lever, said fulcrumed lever controlled by a helical cam, a rocking shaft connected to said cam, a hand lever attached to said rocking shaft, a counterweight attached to said hand lever, substantially as set forth.

5. In a machine of the character described, the combination with a table, of knives arranged at three edges of the table and co-acting with said edges, means for operating said knives, and stops adapted to serve as guides for the work on the table, said stops being at a distance from the knives corresponding to the various widths and lengths of the sheet to be produced.

6. In a machine of the character described, the combination with a table, of knives arranged at three edges of the table and co-acting with said edges, means for operating the knives, movable stops serving as guides for the work on the table and arranged in the table at a distance from the knives corresponding to the various widths and lengths of the sheet to be produced, and means whereby the stops may be brought alternately above the table top.

GODFREY BENINGTON JOHNSON.

Witnesses:
GEORGE E. MINTERN,
WILLIAM G. E. DAVIES.